(12) United States Patent
Witkowski et al.

(10) Patent No.: US 11,149,885 B2
(45) Date of Patent: Oct. 19, 2021

(54) CARBURIZING GRADE MICRO-ALLOY HIGH PRESSURE SWIVEL JOINTS

(71) Applicant: S.P.M. FLOW CONTROL, INC., Fort Worth, TX (US)

(72) Inventors: Brian C. Witkowski, Fort Worth, TX (US); Matt Treida, Fort Worth, TX (US); Ben Ward, Fort Worth, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 398 days.

(21) Appl. No.: 15/942,120

(22) Filed: Mar. 30, 2018

(65) Prior Publication Data

US 2018/0306358 A1 Oct. 25, 2018

Related U.S. Application Data

(60) Provisional application No. 62/488,619, filed on Apr. 21, 2017.

(51) Int. Cl.
| | |
|---|---|
| *F16L 27/08* | (2006.01) |
| *F16L 21/02* | (2006.01) |
| *B23P 13/02* | (2006.01) |
| *B23P 15/00* | (2006.01) |
| *C22C 38/00* | (2006.01) |

(Continued)

(52) U.S. Cl.
CPC ........... *F16L 27/0845* (2013.01); *B23P 13/02* (2013.01); *B23P 15/00* (2013.01); *C22C 38/00* (2013.01); *F16L 21/02* (2013.01); *F16L 27/0828* (2013.01); *B23P 2700/11* (2013.01); *F16C 19/02* (2013.01); *F16C 43/04* (2013.01)

(58) Field of Classification Search
CPC ............... F16L 27/0824; F16L 27/0828; F16L 27/0832; F16L 27/084
USPC .............................................. 285/121.6, 276
See application file for complete search history.

(56) References Cited

U.S. PATENT DOCUMENTS

| | | | | |
|---|---|---|---|---|
| 3,347,570 A | * | 10/1967 | Roessler | F16L 27/0824 285/94 |
| 4,185,841 A | * | 1/1980 | Brundage | F16L 27/0828 277/363 |

(Continued)

OTHER PUBLICATIONS

Steel Dynamics, Inc., Bar Data Handbook | AISI/SAE | Chemical Compositions and Metallurgical Data, 2nd edition; https://www.steeldynamics.com/SDI/media/Clint-s-Media-Library/Steel-Dynamics-Bar-Book-Rev-2-New-Cover.pdf; pp. 194; Downloaded Dec. 9, 2020. (Year: 2017).*

*Primary Examiner* — Aaron M Dunwoody
(74) *Attorney, Agent, or Firm* — Baker & McKenzie LLP

(57) ABSTRACT

A high pressure swivel comprises a first tube; a second tube; and a plurality of balls contained between a plurality of bearing races and a plurality of complimentary bearing races, wherein the first tube and the second tube comprise a carburizing grade micro-alloy steel, wherein the carburizing grade micro-alloy steel comprises a yield strength of greater than about 110,000 psi, a tensile strength of greater than about 130,000 psi, an elongation of greater than about 14%, a reduction area of greater than about 45%, and a longitudinal Charpy v-notch of greater than about 31 ft/lbs longitudinal at about −40° C., and a nickel concentration of less than about 1 wt. %, by weight of the carburizing grade micro-alloy steel, and a carbon content of less than about 0.15 wt. %, by weight of the carburizing grade micro-alloy steel.

12 Claims, 9 Drawing Sheets

(51) Int. Cl.
*F16C 19/02* (2006.01)
*F16C 43/04* (2006.01)

(56) References Cited

U.S. PATENT DOCUMENTS

| | | | | |
|---|---|---|---|---|
| 4,431,217 A | * | 2/1984 | Witt | F16J 15/065 285/108 |
| 4,489,953 A | * | 12/1984 | Witt | F16J 15/065 277/584 |
| 4,626,003 A | * | 12/1986 | Williams | F16L 27/0828 277/361 |
| 4,693,500 A | * | 9/1987 | Anderson | F16L 27/0828 285/276 |
| 5,538,296 A | * | 7/1996 | Horton | F16L 27/0824 285/276 |
| 6,164,707 A | * | 12/2000 | Ungchusri | F16L 27/0824 285/276 |
| 2009/0008934 A1 | * | 1/2009 | Matzner | F16C 19/08 285/276 |
| 2015/0050083 A1 | * | 2/2015 | Funderud | E21B 17/1078 403/376 |
| 2016/0153596 A1 | * | 6/2016 | Ungchusri | F16J 15/121 285/93 |
| 2017/0276274 A1 | * | 9/2017 | Michot | F16L 25/01 |
| 2017/0299096 A1 | * | 10/2017 | Nowell | E21B 17/05 |

\* cited by examiner

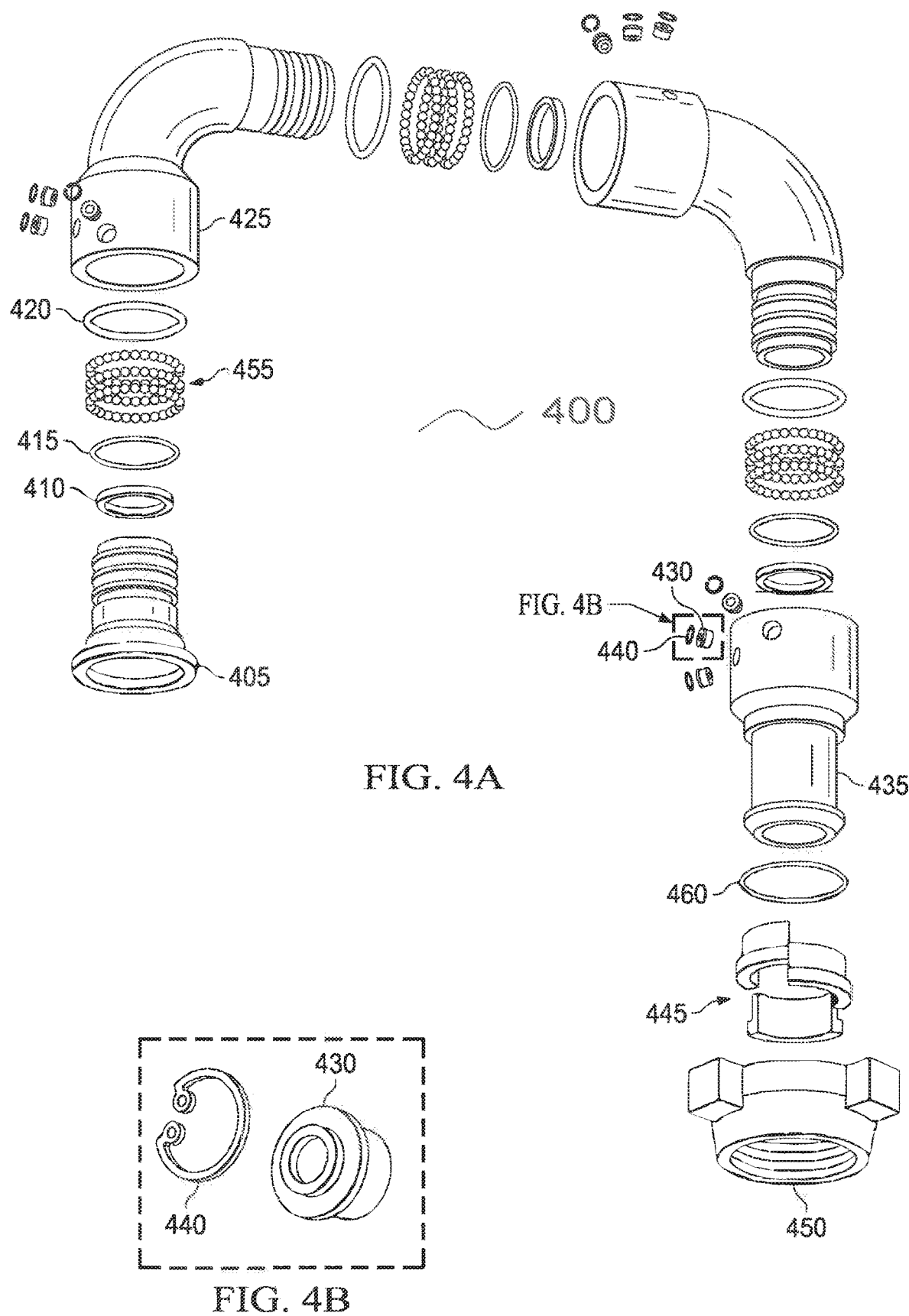

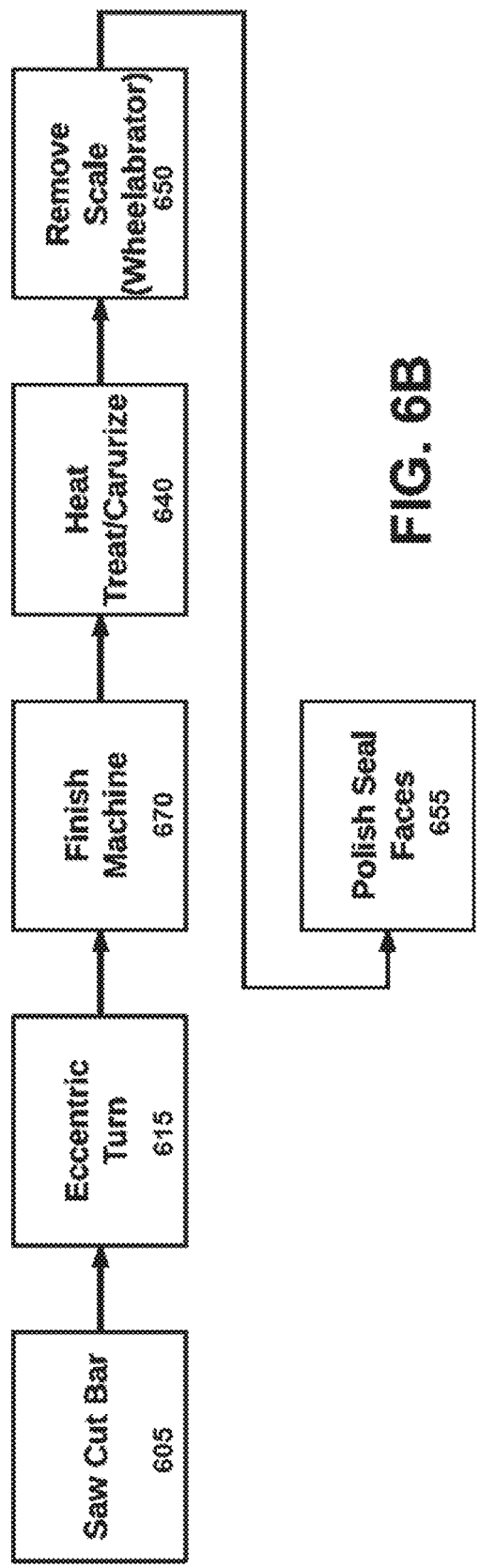

CARBURIZING GRADE MICRO-ALLOY HIGH PRESSURE SWIVEL JOINTS

CROSS-REFERENCE TO RELATED APPLICATIONS

This application claims priority to U.S. Provisional Application No. 62/488,619 filed Apr. 21, 2017. The contents of all of the above are hereby incorporated in their entirety by reference.

FIELD OF THE DISCLOSURE

The present disclosure relates, in some embodiments, to high pressure swivel joints and methods of forming high pressure swivel joints (e.g., for use with oil and gas field equipment including, for example, oilfield plumbing configured for high pressure fluid service applications).

BACKGROUND OF THE DISCLOSURE

Swivel joints allow flexibility and/or directional change in plumbing systems used during the transportation of liquids, gases, and/or semi-solid substances. Accordingly, in the oil and gas field, it is desirable that swivel joints facilitate fluid flow while maintaining integrity against fluid pressure, temperature, abrasiveness, and chemical reactivity. Also, swivel joints are needed that desirably resist environmental weathering caused by low and high temperatures; air and water flow; precipitation; soil contact, and UV exposure. Durable swivel joints are desirable to resist mechanical wear caused by plumbing system assembly, maintenance, and performance, wherein the composition of the metal (e.g., steel) used to construct the swivel joint plays a factor.

SUMMARY

Accordingly, a need has arisen for improved high pressure swivel joints. A high pressure swivel joint may comprise (a) a first tube comprising: a first tube central longitudinal axis; a first tube interior circumferential surface; a first tube outer circumferential surface; a first tube first end comprising a male connector comprising a plurality of bearing races; and a first tube second end; (b) a second tube comprising: a second tube central longitudinal axis; a second tube interior circumferential surface; a second tube outer circumferential surface; and a second tube first end comprising a female connector comprising a plurality of complimentary bearing races; and (c) a plurality of balls contained between the plurality of bearing races and the plurality of complimentary bearing races, wherein the first tube first end and the second tube first end are configured to connect to form an articulating joint, and wherein the first tube and the second tube comprise a carburizing grade micro-alloy steel, wherein the carburizing grade micro-alloy steel comprises a yield strength of greater than about 110,000 psi, a tensile strength of greater than about 130,000 psi, an elongation of greater than about 14%, a reduction area of greater than about 45%, and a longitudinal Charpy v-notch of greater than about 31 ft/lbs longitudinal at about −40° C., and a nickel concentration of less than about 1 wt. %, by weight of the carburizing grade micro-alloy steel, and a carbon content of less than about 0.15 wt. %, by weight of the carburizing grade micro-alloy steel.

According to some embodiments, a method of making a high pressure swivel joint may comprise (a) eccentric turning a billet to form a turned billet; (b) bending the turned billet to form a bent billet; (c) upset forging the bent billet to form an upset forged billet; (c) machining of the upset forged billet to form: a first tube comprising: a first tube central longitudinal axis; a first tube interior circumferential surface; a first tube outer circumferential surface; a first tube first end comprising a male connector comprising a plurality of bearing races; and a first tube second end; (d) carburizing the first tube to form a carburized first tube; (e) polishing the carburized first tube form a polished first tube; and (f) combining the polished first tube with a second tube to form a high pressure swivel joint, wherein the at least one billet comprises a carburizing grade micro-alloy steel, wherein the carburizing grade micro-alloy steel comprises a yield strength of greater than about 110,000 psi, a tensile strength of greater than about 130,000 psi, an elongation of greater than about 14%, a reduction area of greater than about 45%, and a longitudinal Charpy v-notch of greater than about 31 ft/lbs longitudinal at about −40° C., a nickel concentration of less than about 1 wt. %, by weight of the carburizing grade micro-alloy steel, and a carbon content of less than about 0.15 wt. %, by weight of the carburizing grade micro-alloy steel.

In some embodiments, a method of making a high pressure swivel joint may comprise: (a) eccentric turning a billet to form a turned billet; (b) upset forging the turned billet to form an upset forged billet; (c) machining of the upset forged billet to form: a first tube comprising: a first tube central longitudinal axis; a first tube interior circumferential surface; a first tube outer circumferential surface; a first tube first end comprising a male connector comprising a plurality of bearing races; and a first tube second end; (d) carburizing the first tube to form a carburized first tube; (e) polishing the carburized first tube form a polished first tube; and (f) combining the polished first tube with a second tube to form a high pressure swivel joint, wherein the at least one billet comprises a carburizing grade micro-alloy steel, wherein the carburizing grade micro-alloy steel comprises a yield strength of greater than about 110,000 psi, a tensile strength of greater than about 130,000 psi, an elongation of greater than about 14%, a reduction area of greater than about 45%, and a longitudinal Charpy v-notch of greater than about 31 ft/lbs longitudinal at about −40° C., a nickel concentration of less than about 1 wt. %, by weight of the carburizing grade micro-alloy steel, and a carbon content of less than about 0.15 wt. %, by weight of the carburizing grade micro-alloy steel.

A method may comprise machining of the upset forged billet to form the second tube, the second tube comprising: a second tube central longitudinal axis; a second tube interior circumferential surface; a second tube outer circumferential surface; a second tube first end comprising a female connector comprising a plurality of complimentary bearing races. A method may comprise sawing a billet prior to the eccentric turning. A method may comprise heat forging a billet prior to the eccentric turning. A second tube may be carburized and polished. A method may comprise machining of an upset forged billet to form a second tube.

BRIEF DESCRIPTION OF THE DRAWINGS

Some embodiments of the disclosure may be understood by referring, in part, to the present disclosure and the accompanying drawings, wherein:

FIG. 4A illustrates an exploded view of a swivel joint assembly according to a specific example embodiment of the disclosure;

FIG. 4B illustrates an exploded view of a swivel joint assembly according to a specific example embodiment of the disclosure;

FIG. 6B illustrates a 2 inch swivel manufacturing process according to a specific example embodiments of the disclosure.

Figure 1:
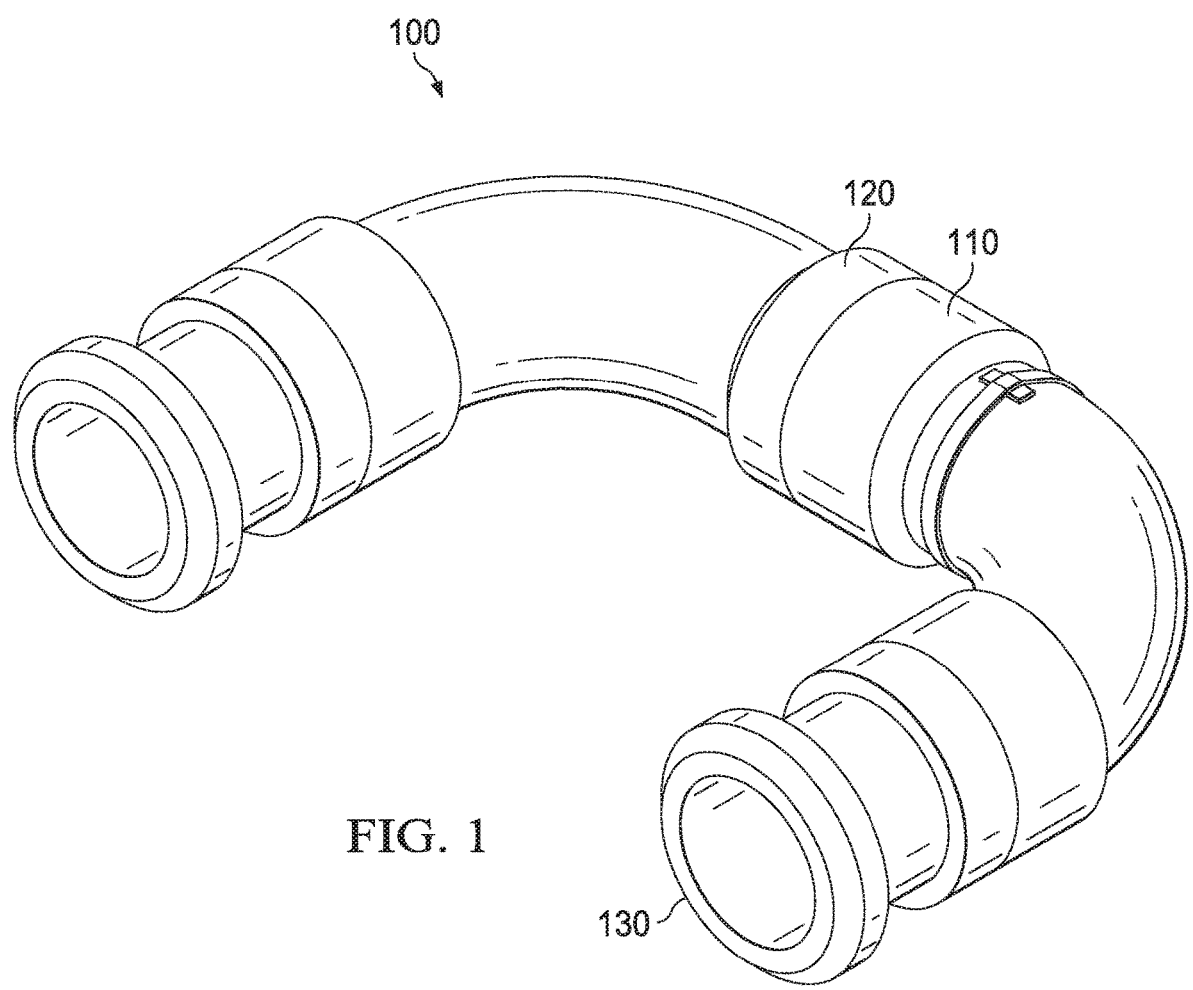
FIG. 1 illustrates an isometric view of a swivel joint according to a specific example embodiment of the disclosure.

Table 1 below includes the reference numerals used in this application. The thousands and hundreds digits correspond to the figure in which the item appears while the tens and ones digits correspond to the particular item indicated.

TABLE 1

Figure 2A:
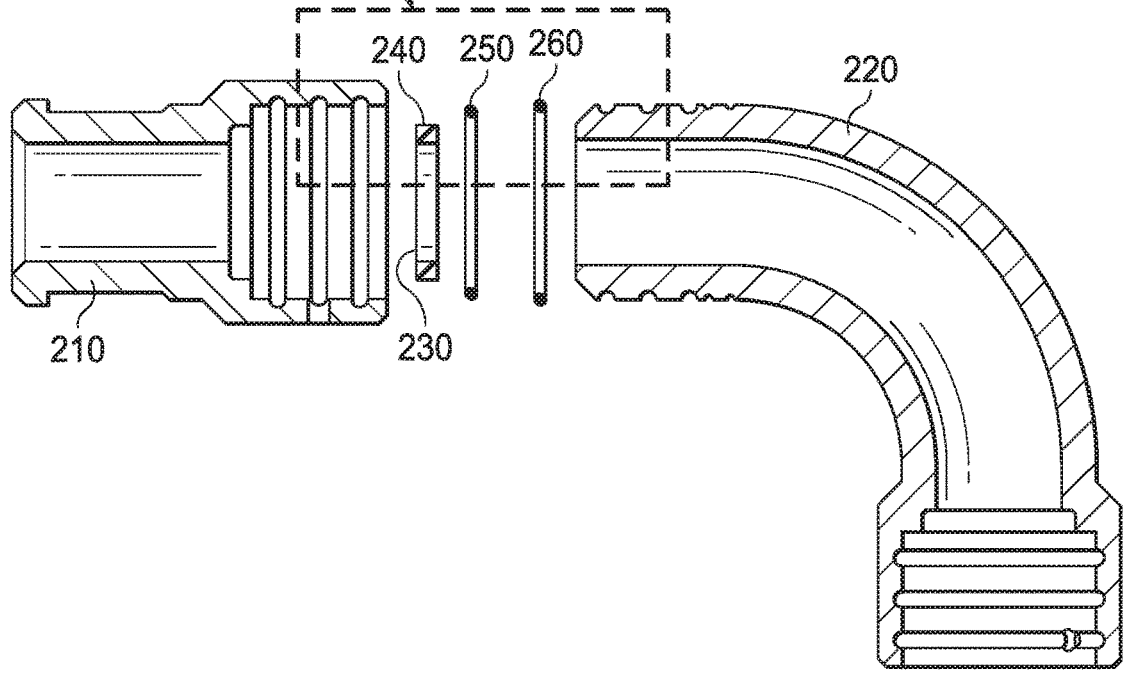
FIG. 2A illustrates a sectional view of a male connector and a female connector of a swivel joint according to a specific example embodiment of the disclosure.
Figure 2B:
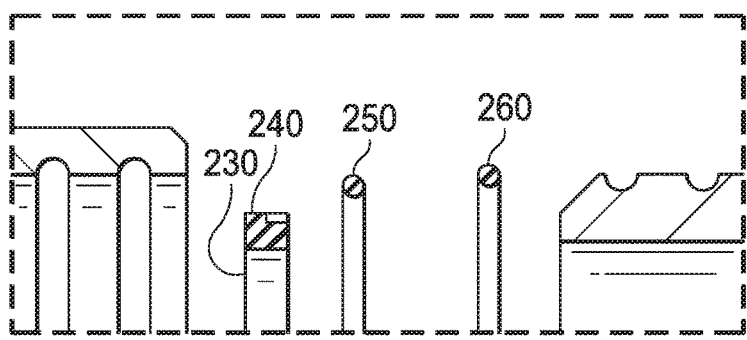
FIG. 2B illustrates a sectional view of a separated articulated joint.
Figure 2C:
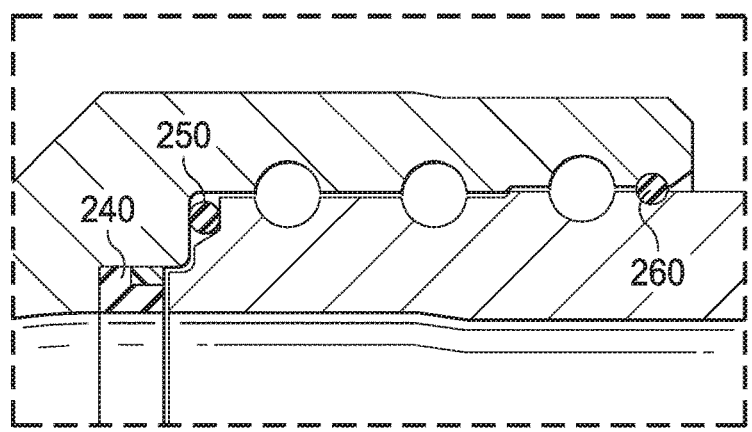
FIG. 2C illustrates a sectional view of an assembled articulated joint.
Figure 3A:
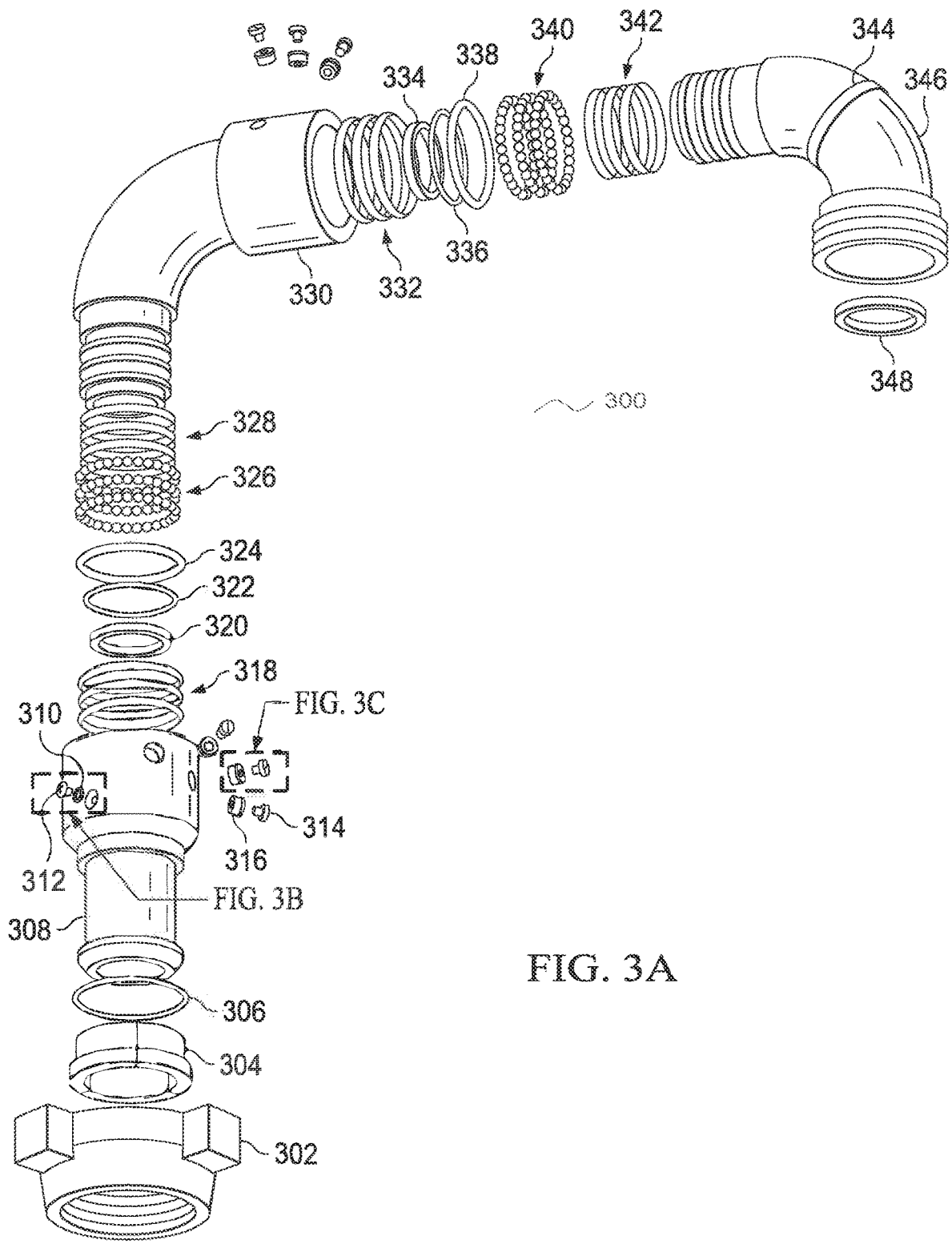
FIG. 3A illustrates an exploded view of a swivel joint assembly according to a specific example embodiment of the disclosure.
Figure 3B:
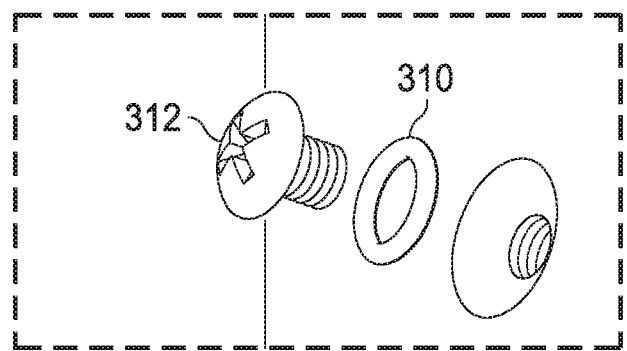
FIG. 3B illustrates an exploded view containing a lube plug and a lube plug O-ring according to a specific example embodiment of the disclosure.
Figure 3C:
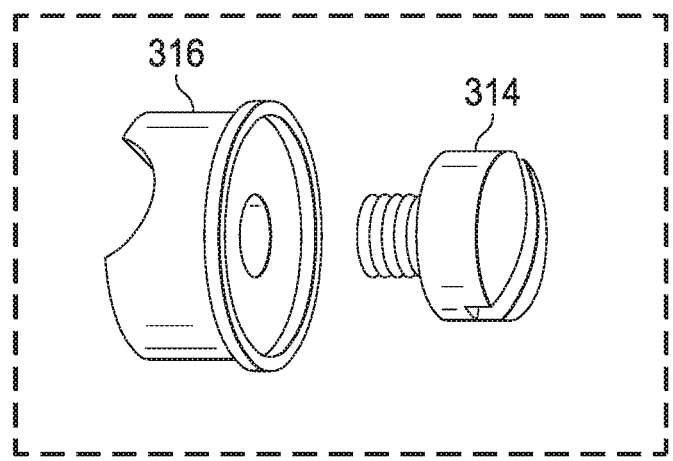
FIG. 3C illustrates an exploded view containing a seal ring and an O-ring according to a specific example embodiment of the disclosure.
Figure 5A:
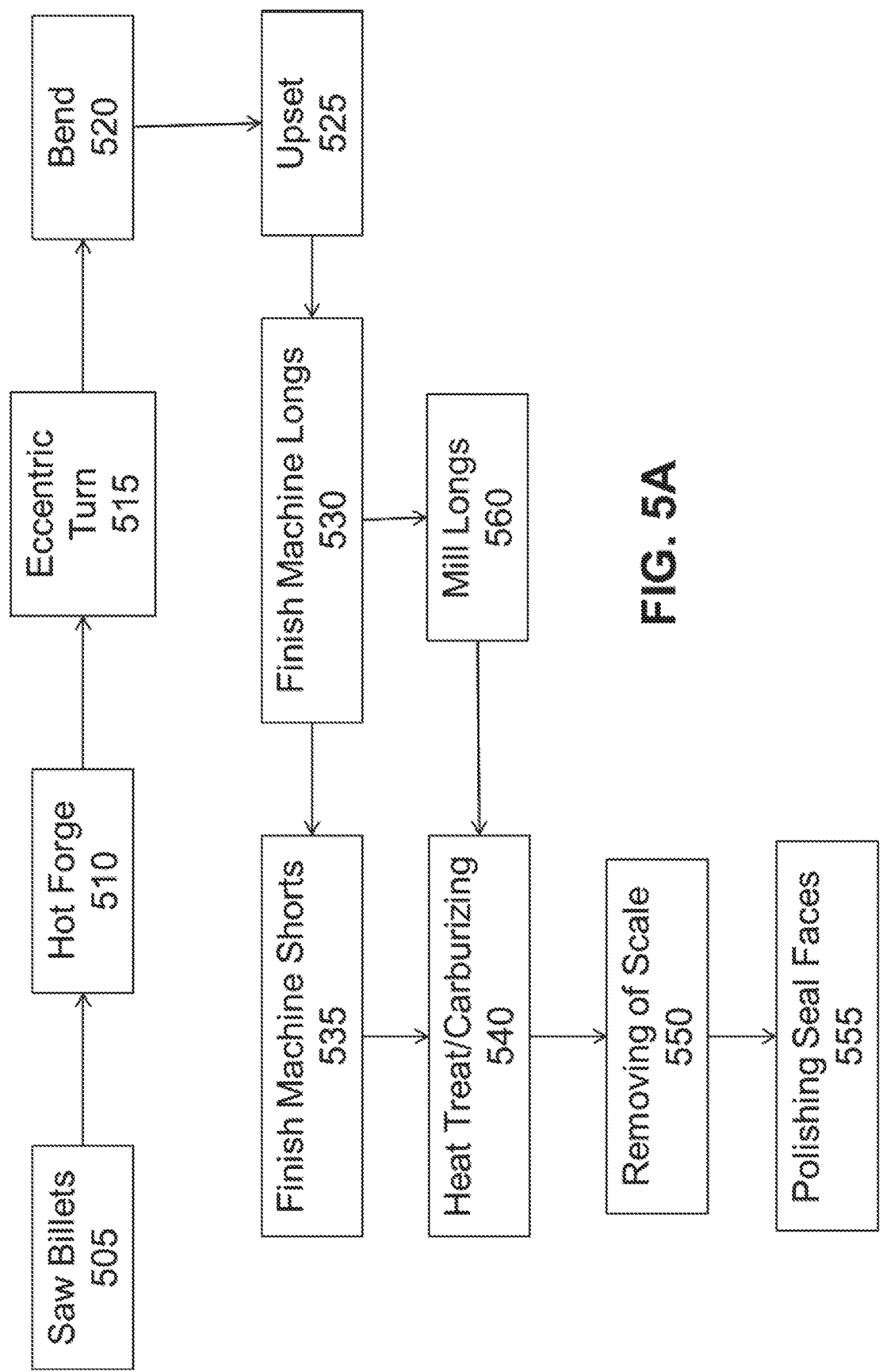
FIG. 5A illustrates a 3 inch swivel manufacturing process according to a specific example embodiments of the disclosure.
Figure 5B:
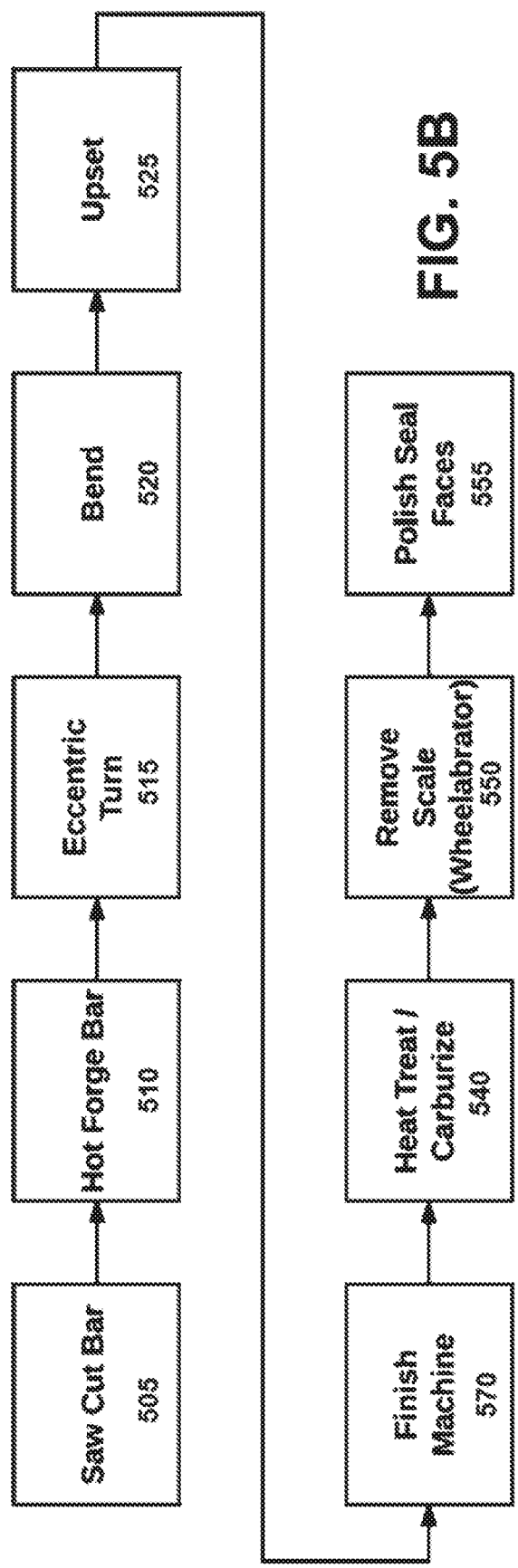
FIG. 5B illustrates a 3 inch swivel manufacturing process according to a specific example embodiments of the disclosure.
Figure 6A:
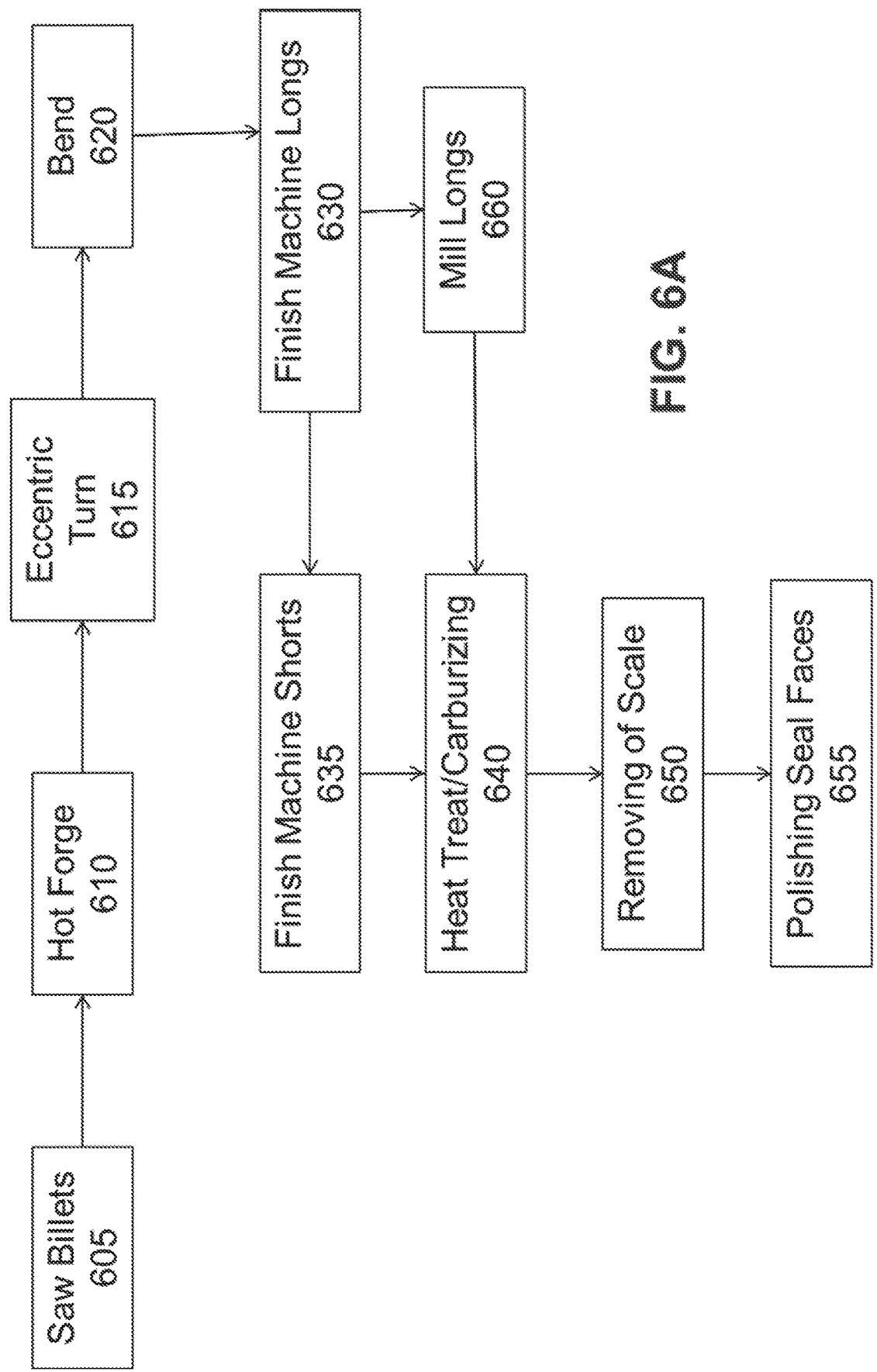
FIG. 6A illustrates a 2 inch swivel manufacturing process according to a specific example embodiments of the disclosure.

| | FIG. 1 | FIG. 2A | FIG. 2B | FIG. 2C | FIG. 3A | FIG. 3B | FIG. 3C | FIG. 4A | FIG. 4B | FIG. 5A | FIG. 5B | FIG. 6A | FIG. 6B |
|---|---|---|---|---|---|---|---|---|---|---|---|---|---|
| High Pressure Swivel Joint | 100 | | | | | | | | | | | | |
| Connector | 130 | | | | | | | | | | | | |
| Female Connector | 110 | 210 | | | | | | | | | | | |
| Male Connector | 120 | 220 | | | | | | | | | | | |
| Main Packing | | 230 | 230 | | | | | | | | | | |
| Anti-Extrusion Ring | | 240 | 240 | 240 | | | | | | | | | |
| Backup Seal | | 250 | 250 | 250 | | | | | | | | | |
| Grease Retainer (Dust Seal) | | 260 | 260 | 260 | | | | | | | | | |
| Wing Nut | | | | | 302 | | | 450 | | | | | |
| Retainer Segments | | | | | 304 | | | 445 | | | | | |
| Retainer Ring | | | | | 306 | | | 440 | 440 | | | | |
| Swivel Elbow Male/Female Ball Race | | | | | 308 | | | | | | | | |
| Lube Plug O-Ring | | | | | 310 | 310 | | | | | | | |
| Lube Plug | | | | | 312 | 312 | | | | | | | |
| Retainer Ring Bolt | | | | | 314 | | 314 | | | | | | |
| Retainer Ring | | | | | 316 | | 316 | 460 | | | | | |
| Female Ball Race Inserts | | | | | 318 | | | | | | | | |
| Swivel Seal Ring | | | | | 320 | | | 415 | | | | | |
| Swivel O-Ring | | | | | 322 | | | 420 | | | | | |
| Swivel Dust Seal | | | | | 324 | | | 410 | | | | | |
| Bearings | | | | | 326 | | | 455 | | | | | |
| Male Ball Race Inserts | | | | | 328 | | | | | | | | |
| Swivel Elbow Male/Female Ball Race | | | | | 330 | | | 425 | | | | | |
| Female Ball Race Inserts | | | | | 332 | | | | | | | | |
| Swivel Seal Ring | | | | | 334 | | | | | | | | |
| Swivel O-Ring | | | | | 336 | | | | | | | | |
| Swivel Dust Seal | | | | | 338 | | | | | | | | |
| Bearings | | | | | 340 | | | | | | | | |
| Male Ball Race Inserts | | | | | 342 | | | | | | | | |
| Data band | | | | | 344 | | | | | | | | |
| Swivel Elbow Male Ball Race | | | | | 346 | | | | | | | | |
| Seal Ring | | | | | 348 | | | | | | | | |
| Coupling/Safety Iron/Male Ball Race | | | | | | | | 405 | | | | | |

TABLE 1-continued

| | FIG. 1 | FIG. 2A | FIG. 2B | FIG. 2C | FIG. 3A | FIG. 3B | FIG. 3C | FIG. 4A | FIG. 4B | FIG. 5A | FIG. 5B | FIG. 6A | FIG. 6B |
|---|---|---|---|---|---|---|---|---|---|---|---|---|---|
| Ball Plug Assembly | | | | | | | | 430 | 430 | | | | |
| Swivel Coupling/Female Ball Race | | | | | | | | | 435 | | | | |
| Saw Billets | | | | | | | | | | 505 | 505 | 605 | 605 |
| Hot Forge | | | | | | | | | | 510 | 510 | 610 | |
| Eccentric Turn | | | | | | | | | | 515 | 515 | 615 | 615 |
| Bend | | | | | | | | | | 520 | 520 | 620 | |
| Upset | | | | | | | | | | 525 | 525 | | |
| Finish Machine Longs | | | | | | | | | | 530 | | 630 | |
| Finish Machine Shorts | | | | | | | | | | 535 | | 635 | |
| Heat Treat/Carburize | | | | | | | | | | 540 | 540 | 640 | 640 |
| Removing of Scale | | | | | | | | | | 550 | 550 | 650 | 650 |
| Polishing Seal Faces | | | | | | | | | | 555 | 555 | 655 | 655 |
| Mill Longs | | | | | | | | | | 560 | | 660 | |
| Finish Machine | | | | | | | | | | | 570 | | 670 |

DETAILED DESCRIPTION

The present disclosure relates, in some embodiments, to high pressure swivel joints comprising a carburizing grade micro-alloy steel and methods of making high pressure swivel joints comprising a carburizing grade micro-alloy steel. A swivel joint may desirably allow directional changes for plumbing systems that transport fluids (e.g., oil) in the oil and gas industry. A swivel may be installed in various locations throughout an oil and gas industry site including a wellhead of a fracturing site, a ground iron between a Frac truck and a manifold trailer, and in flow back systems. A swivel joint may comprise a high-strength low-alloy (HSLA) carburizing grade micro-alloy steel. A swivel joint may comprise a carburizing grade micro-alloy steel. During a fluid transport process, a swivel joint comprising a carburizing grade micro-alloy steel may desirably maintain integrity against high pressures (e.g., 25,000 psi) exerted by the fluids being transported, high (e.g., 180° C.) and low (e.g., −46° C.) temperatures of the fluids, and chemical reactivity caused by chemicals (e.g., $H_2S$) contained in the fluids. A swivel joint comprising a carburizing grade micro-alloy steel may desirably maintain swivel integrity.

In some embodiments, a swivel joint comprising a carburizing grade micro-alloy steel may maintain integrity and/or resist wear caused by environmental factors, for example, factors comprising high environmental temperatures (e.g., 60° C.), low environmental temperatures (e.g. −80° C.), wind, water, precipitation (e.g. snow and rain), and/or UV exposure. A swivel joint comprising a carburizing grade micro-alloy steel may desirably maintain swivel integrity and/or resist wear caused by environmental factors. A swivel joint comprising carburizing grade micro-alloy steel may desirably maintain swivel integrity and/or resist wear caused by environmental factors. A swivel joint comprising a carburizing grade micro-alloy steel may desirably resist mechanical wear caused by a plumbing system assembly, maintenance of the plumbing system, and/or performance of the plumbing system.

A swivel joint comprising a carburizing grade micro-alloy steel may advantageously comprise a yield strength of greater than about 70,000 psi, or greater than about 75,000 psi, or greater than about 80,000 psi, or greater than about 85,000 psi, or greater than about 90,000 psi, or greater than about 95,000 psi, or greater than about 100,000 psi, or greater than about 105,000 psi, or greater than about 110,000 psi, or greater than about 115,000 psi, or greater than about 120,000 psi, or greater than about 125,000 psi, or greater than about 130,000 psi. A swivel joint comprising a carburizing grade micro-alloy steel may advantageously comprise a yield strength of greater than about 110,000 psi. A carburizing grade micro-alloy steel having a desirable yield strength may not undesirably deform plastically.

In some embodiments, a swivel joint comprising a carburizing grade micro-alloy steel may desirably maintain integrity against pressures exerted by a fluid, the pressures comprising greater than about 10,000 psi, or of about 11,000 psi, or of about 12,000 psi, or of about 13,000 psi, or of about 14,000 psi, or of about 15,000 psi, or of about 16,000 psi, or of about 18,000 psi, or of about 20,000 psi, or of about 25,000 psi, or of about 30,000 psi, or of about 35,000 psi. A swivel joint comprising a carburizing grade micro-alloy steel may desirably maintain integrity against pressures of about 25,000 psi as exerted by a fluid.

A swivel joint comprising a carburizing grade micro-alloy steel may desirably maintain integrity against fluids being transported at a temperature of more than about 100° C., or more than about 110° C., or more than about 120° C., or more than about 130° C., or more than about 140° C., or more than about 150° C., or more than about 160° C., or more than about 170° C., or more than about 176° C., or more than about 180° C., or more than about 190° C., or more than about 200° C., or more than about 210° C., or more than about 220° C. According to some embodiments, a swivel joint comprising a carburizing grade micro-alloy steel may desirably maintain integrity against fluids being transported at a temperature of less than about 90° C., or less than about 60° C., or less than about 40° C., or less than about 20° C., or less than about 0° C., or less than about −10° C., or less than about −20° C., or less than about −30° C., or less than about −40° C., or less than about −46° C.

In some embodiments, a swivel joint comprising a carburizing grade micro-alloy steel may advantageously comprise a tensile strength of greater than about 70,000 psi, or greater than about 75,000 psi, or greater than about 80,000 psi, or greater than about 85,000 psi, or greater than about 90,000 psi, or greater than about 95,000 psi, or greater than about 100,000 psi, or greater than about 105,000 psi, or greater than about 110,000 psi, or greater than about 115,000 psi, or greater than about 120,000 psi, or greater than about 125,000 psi, or greater than about 130,000 psi, or greater than about 135,000 psi, or greater than about 140,000 psi, or greater than about 145,000 psi, or greater than about 150,000 psi. A swivel joint comprising a carburizing grade micro-alloy steel may advantageously comprise a tensile strength of greater than about 130,000 psi. A swivel joint comprising a carburizing grade micro-alloy steel having a desirable tensile strength may desirably withstand tension.

In some embodiments, a swivel joint comprising a carburizing grade micro-alloy steel may advantageously comprise an elongation of greater than about 8%, or greater than about 9%, or greater than about 10%, or greater than about 11%, or greater than about 12%, or greater than about 13%, or greater than about 14%, or greater than about 15%, or greater than about 16%, or greater than about 17%, or greater than about 18%. A swivel joint comprising a carburizing grade micro-alloy steel may advantageously comprise an elongation of greater than about 14%. A swivel joint comprising a carburizing grade micro-alloy steel having a desirable elongation may desirably withstand elongation.

A swivel joint comprising a carburizing grade micro-alloy steel, according to some embodiments, may advantageously comprise a reduction in area of greater than about 30%, or greater than about 35%, or greater than about 40%, or greater than about 45%, or greater than about 50%, or greater than about 55%, or greater than about 60%. A swivel joint comprising a carburizing grade micro-alloy steel may advantageously comprise a reduction in area of greater than about 45%. A carburizing grade micro-alloy steel having a desirable reduction in area may have desirable ductility.

According to some embodiments, a swivel joint comprising a carburizing grade micro-alloy steel may advantageously comprise a longitudinal Charpy v-notch of greater than about 25 ft/lbs longitudinal, or greater than about 26 ft/lbs longitudinal, or greater than about 27 ft/lbs longitudinal, or greater than about 28 ft/lbs longitudinal, or greater than about 29 ft/lbs longitudinal, or greater than about 30 ft/lbs longitudinal, or greater than about 31 ft/lbs longitudinal, or greater than about 32 ft/lbs longitudinal, or greater than about 33 ft/lbs longitudinal, or greater than about 34 ft/lbs longitudinal, or greater than about 35 ft/lbs longitudinal, or greater than about 36 ft/lbs longitudinal, or greater than about 37 ft/lbs longitudinal, or greater than about 38 ft/lbs longitudinal, at a temperature of about −30° C., or at a temperature of about −32° C., or at a temperature of about −34° C., or at a temperature of about −36° C., or at a temperature of about −38° C., or at a temperature of about −40° C., or at a temperature of about −42° C., or at a temperature of about −44° C., or at a temperature of about −46° C., or at a temperature of about −48° C., or at a temperature of about −50° C. A swivel joint comprising a carburizing grade micro-alloy steel may advantageously comprise a longitudinal Charpy v-notch of greater than about 31 ft/lbs longitudinal at about ° C. A swivel joint comprising a carburizing grade micro-alloy steel having a desirable longitudinal Charpy v-notch may have a desirable toughness, may have a desirable temperature-dependent ductile-brittle transition, or may have a desirable energy absorption during fracture.

A swivel joint comprising a carburizing grade micro-alloy steel may have an effective case depth measured at 45 RC (Rockwell Hardness measured on the C scale, also HRC, Rc, or HRc) from about 0.050" to about 0.065". A swivel joint comprising a carburizing grade micro-alloy steel may have an effective case depth measured at 45 RC (Rockwell Hardness measured on the C scale) from about 0.040" to about 0.080", or from about 0.045" to about 0.075", or from about 0.045" to about 0.070", or from about 0.050" to about 0.065", or from about 0.055" to about 0.065". A swivel joint comprising a carburizing grade micro-alloy steel having an effective case depth measured at 45 RC from about 0.050" to about 0.065" may advantageously resist wear and strength fatigue under dynamic and/or thermal stresses. A swivel joint comprising a carburizing grade micro-alloy steel may comprise an effective case depth measured at 45 RC from about 0.050" to about 0.065" may advantageously resist wear and strength fatigue under dynamic and/or thermal stresses.

A swivel joint comprising a carburizing grade micro-alloy steel may have a surface hardness after temper from about 50 RC to about 70 RC, or about 55 RC to about 65 RC, or from about 60 RC to about 65 RC. A swivel joint comprising a carburizing grade micro-alloy steel may have a surface hardness after temper from about 55 RC to about 60 RC. A swivel joint comprising a carburizing grade micro-alloy steel may have a desirable surface hardness after temper may desirably maintain performance and durability. In some embodiments, a hardness of a swivel joint comprising a carburizing grade micro-alloy steel may be reduced to an RC max of about 20, or of about 21, or of about 22, or of about 23, or of about 24, or of about 25. Tempering may be required to reduce a hardness of a swivel joint comprising a carburizing grade micro-alloy steel. Reducing a hardness of a swivel joint comprising a carburizing grade micro-alloy steel may desirably balance hardness with other mechanical properties (e.g., malleability).

According to some embodiments, a swivel joint comprising a carburizing grade micro-alloy steel may advantageously comprise a nickel concentration of less than about 5 wt. %, or less than about 4 wt. %, or less than about 3 wt. %, or less than about 2 wt. %, or less than about 1.5 wt. %, or less than about 1.2 wt. %, or less than about 1 wt. %, or less than about 0.8 wt. %, or less than about 0.6 wt. % by weight of the carburizing grade micro-alloy steel. A swivel joint comprising a carburizing grade micro-alloy steel may advantageously comprise a nickel concentration of less than about 1 wt. %, by weight of the carburizing grade micro-alloy steel. In some embodiments, a swivel joint comprising a carburizing grade micro-alloy steel having a desirable nickel concentration may have a desirable resistance against thiols (e.g., $H_2S$, $CH_3H$). A swivel joint comprising a carburizing grade micro-alloy steel may be resistant towards hydrogen sulfide, swamp gas, and/or sour gas. A carburizing grade micro-alloy steel may comprise nickel, wherein nickel may increase the mechanical strength (e.g., yield, tensile strength, Charpy v-notch, and toughness). A swivel joint comprising a carburizing grade micro-alloy steel may advantageously comprise a low nickel concentration (e.g., less than about 1 wt. %) while still having desirable mechanical strength.

A swivel joint comprising a carburizing grade micro-alloy steel may comprise a micro-alloy steel. A micro-alloy steel may have a carbon content of less than about 0.6 wt. %, or less than about 0.5 wt. %, or less than about 0.4 wt. %, or less than about 0.3 wt., or less than about 0.2.5 wt. %, or less than about 0.2 wt. %, or less than about 0.15 wt. %, or less than about 0.1 wt. %, by weight of the micro-alloy steel. A micro-alloy steel may have a carbon content of about 0.15 wt. %, by weight of the micro-alloy steel. A micro-alloy steel may comprise iron, niobium, vanadium, titanium, molybdenum, zirconium, boron, or other rare-earth metals.

Specific Example Embodiments

Specific example embodiments of a high pressure swivel joint are illustrated in FIGS. 1-6. As shown in FIG. 1, according to some embodiments, a high pressure swivel joint 100 may comprise a male connector 120, a female connector 110, or at least one connector 130. A connector may comprise a union (e.g. wingnut union), a coupling (e.g., slip), a swage, a plug (e.g., bull plug and gauge plug), a valve (e.g., plug valve, check valve, and relief), an integral pup joint (e.g., safety Iron®), a tee, a lateral, a wye, an ell, a reducer, a cross, or a cap.

In some embodiments, as shown in FIGS. 2A, 2B, and 2C, a high pressure swivel joint comprising a carburizing grade micro-alloy steel 200 may comprise a male connector 220 or a female connector 210. A male connector 220 and a female connector 210 may coaxially interconnect and rotate relative to each other while maintaining a high pressure seal. An articulating joint may comprise an interconnection between a male connector 220 and a female connector 210. A high pressure swivel joint comprising a carburizing grade micro-alloy steel 200 may comprise a main packing 230, an anti-extrusion ring 240, a backup seal 250, or a grease retainer (i.e., dust seal) 260.

According to some embodiments, as shown in FIGS. 3A, 3B, and 3C, a high pressure swivel joint comprising a carburizing grade micro-alloy steel 300 may comprise a wing nut 302, retainer segments 304, a retainer ring 306, a swivel elbow male/female ball race 308, a lube plug O-ring 310, a lube plug 312, a retainer ring bolt 314, a retainer ring 316, or female ball race inserts 318. A high pressure swivel joint 300 may comprise a swivel seal ring 320, a swivel O-ring 322, a swivel dust seal 324, bearings 326, male ball race insert 328, a swivel elbow male/female ball race 330, or female ball race inserts 332. A high pressure swivel joint 300 may also comprise a swivel seal ring 334, a swivel O-ring 336, a swivel dust seal 338, bearings (i.e., balls) 340, a male ball race insert 342, a data band 344, a swivel elbow male ball race 346, or a seal ring 348. A high pressure swivel joint 300 may comprise at least about 3 ball races.

As shown in FIGS. 4A and 4B, a high pressure swivel joint comprising a carburizing grade micro-alloy steel 400 may comprise a coupling/safety iron/male ball race 405, a swivel dust seal 410, a swivel seal ring 415, a swivel O-ring 420, a swivel elbow male/female ball race 425, or a ball plug assembly 430. In some embodiments, a high pressure swivel joint comprising a carburizing grade micro-alloy steel 400 may comprise a swivel coupling/female ball race 435, a retainer ring 440, a retainer segment 445, a wing nut 450, bearings 455, or a retainer ring 460.

According to some embodiments, as shown in FIGS. 5A and 5B, methods of making a high pressure swivel joint comprising a carburizing grade micro-alloy steel may comprise a 3 inch swivel manufacturing process 500. For example, a 3 inch swivel manufacturing process 500 may comprise sawing a billet 505, hot forging 510, eccentric turning 515, bending 520, upsetting 525, longs finish machining 530, shorts finish machining 535, heat treating 540, carburizing (e.g., case hardening) 545, removing scale 550, and/or polishing seal faces 555. A 3 inch swivel manufacturing process 500 may comprise, for example, sawing a billet 505, hot forging 510, eccentric turning 515, bending 520, upsetting 525, longs finish machining 530, longs milling 560, finish machining 570, heat treating/carburizing 540, removing scale 550, and/or polishing seal faces 555.

As shown in FIGS. 6A and 6B, methods of making a high pressure swivel joint comprising a carburizing grade micro-alloy steel may comprise a 2 inch swivel manufacturing process 600. A 2 inch swivel manufacturing process 600 may comprise, for example, sawing a billet 605, hot forging 610, eccentric turning 615, bending 620, short machining finish 635, heat treating/carburizing (e.g., case hardening) 640, removing of scale 650, and/or polishing seal faces 655. In some embodiments, a 2 inch swivel manufacturing process 600 may comprise sawing a billet 605, hot forging 610, eccentric turning 615, bending 620, longs finish machining 625, finish machining 670, longs milling 660, heat treating/carburizing 640, removing scale 650, and/or polishing seal faces 655.

As will be understood by those skilled in the art who have the benefit of the instant disclosure, other equivalent or alternative compositions, methods of making, and alternative embodiments of high pressure swivel joints comprising a carburizing grade micro-alloy steel can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of high pressure swivel joints comprising a carburizing grade micro-alloy steel may be varied. In some embodiments, parts of a high pressure swivel joint may be interchangeable. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally may be combined with additional features or steps. Such option may not be exercised and, indeed, in some embodiments, disclosed systems, compositions, apparatuses, and/or methods may exclude any other features or steps beyond those disclosed herein. Elements, compositions, devices, systems, methods, and method steps not recited may be included or excluded as desired or required. Persons skilled in the art may make various changes in methods of preparing and using a composition, device, and/or system of the disclosure. For example, a composition, device, and/or system may be prepared and or used as appropriate for animal and/or human use (e.g., with regard to sanitary, infectivity, safety, toxicity, biometric, and other considerations).

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/−about 10%, depicted value+/−about 50%, depicted value+/−about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a high pressure swivel joint may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

What is claimed is:

1. A high pressure swivel joint comprising:
   (a) a first tube comprising:
      a first tube central longitudinal axis,
      a first tube interior circumferential surface,
      a first tube outer circumferential surface,
      a first tube first end comprising a male connector comprising a plurality of bearing races, and
      a first tube second end;
   (b) a second tube comprising:
      a second tube central longitudinal axis,
      a second tube interior circumferential surface,
      a second tube outer circumferential surface, and
      a second tube first end comprising a female connector comprising a plurality of complimentary bearing races; and
   (c) a plurality of balls contained between the plurality of bearing races and the plurality of complimentary bearing races,
wherein the first tube first end and the second tube first end are configured to connect to form an articulating joint, and wherein the first tube and the second tube comprise a carburizing grade micro-alloy steel, wherein the carburizing grade micro-alloy steel comprises: a yield strength of greater than about 110,000 psi; a tensile strength of greater than about 130,000 psi; an elongation of greater than about 14%; a reduction area of greater than about 45%; a longitudinal Charpy v-notch of greater than about 31 ft/lbs longitudinal at about −40° C.; a nickel concentration of less than 1 wt. %, by weight of the carburizing grade micro-alloy steel; and a carbon content of less than about 0.15 wt. %, by weight of the carburizing grade micro-alloy steel.

2. The high pressure swivel joint according to claim 1, wherein the first tube central longitudinal axis and the second tube central longitudinal axis are coaxial.

3. The high pressure swivel joint according to claim 1, wherein the nickel concentration is less than about 0.6 wt. % by weight of the carburizing grade micro-alloy steel.

4. The high pressure swivel joint according to claim 1, wherein the carburizing grade micro-alloy steel further comprises a case depth measured at 45 Rockwall Hardness measured on a C scale (RC) ranging from about 0.040" to about 0.080".

5. The high pressure swivel joint according to claim 1, wherein the carburizing grade micro-alloy steel further comprises a surface hardness after temper ranging from about 50 RC to about 70 RC.

6. The high pressure swivel joint according to claim 1, wherein the carburizing grade micro-alloy steel further comprises at least one of iron, niobium, vanadium, titanium, molybdenum, zirconium, and boron.

7. A high pressure swivel joint comprising:
   (a) a first tube comprising:
      a first tube central longitudinal axis,
      a first tube interior circumferential surface,
      a first tube outer circumferential surface,
      a first tube first end comprising a male connector comprising a plurality of bearing races, and
      a first tube second end;
   (b) a second tube comprising:
      a second tube central longitudinal axis,
      a second tube interior circumferential surface,
      a second tube outer circumferential surface, and
      a second tube first end comprising a female connector comprising a plurality of complimentary bearing races; and
   (c) a plurality of balls contained between the plurality of bearing races and the plurality of complimentary bearing races,
wherein the first tube first end and the second tube first end are configured to connect to form an articulating joint, and wherein the first tube and the second tube each comprise a carburizing grade micro-alloy steel comprising a nickel concentration of less than 1 wt. % by weight of the carburizing grade micro-alloy steel and a carbon content of less than 0.15 wt. % by weight of the carburizing grade micro-alloy steel.

8. The high pressure swivel joint according to claim 7, wherein the nickel concentration is less than about 0.6 wt. % by weight of the carburizing grade micro-alloy steel.

9. The high pressure swivel joint according to claim 7, wherein the carburizing grade micro-alloy steel further comprises a case depth measured at 45 Rockwall Hardness measured on a C scale (RC) ranging from about 0.040" to about 0.080".

10. The high pressure swivel joint according to claim 7, wherein the carburizing grade micro-alloy steel further comprises a surface hardness after temper ranging from about 50 RC to about 70 RC.

11. The high pressure swivel joint according to claim 7, wherein the carburizing grade micro-alloy steel further comprises at least one of iron, niobium, vanadium, titanium, molybdenum, zirconium, and boron.

12. The high pressure swivel joint according to claim 7, wherein the first tube central longitudinal axis and the second tube central longitudinal axis are coaxial.

* * * * *